United States Patent Office 3,488,379
Patented Jan. 6, 1970

3,488,379
OPTICALLY ACTIVE SALT COMPLEXES OF CARNITINE NITRILE HYDROXIDE AND N-ACRYL GLUTAMIC ACIDS AND THEIR PREPARATION
Tadahiro Dohi, Taneyoshi Yu, and Koji Hiraoka, Narutoshi, Japan, assignors to Otsuka Pharmaceutical Co., Ltd., Tokyo, Japan
No Drawing. Filed Oct. 14, 1966, Ser. No. 586,642
Claims priority, application Japan, Oct. 15, 1965, 40/63,291
Int. Cl. C07c 121/14, 121/42, 101/04
U.S. Cl. 260—465.4                  2 Claims

ABSTRACT OF THE DISCLOSURE

Carnitinenitrile-N-acetyl glutamates are set forth, said compounds being useful in the resolution of carnitine chloride.

---

This invention relates to the synthesis of new optically active complexes of carnitine nitrile hydroxide and N-acyl-glutamic acids and their applications, especially the resolution of dl-carnitine nitrile hydroxide to obtain l- and d-carnitine chloride. The particular resolution reagents here described are important.

l-Carnitine, l-τ-dimethylamino-β-hydroxy butyric acid methyl betains, has the following formula:

$$(CH_3)_3N^+\text{—}CH_2\text{—}CH\text{—}CH_2\text{—}COO^-$$
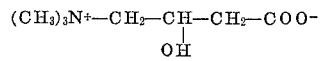

and is widely distributed in micro-organisms, plants, and animals. Since this compound is an essential factor for the growth of *Tenebrio molitor*, it is also called vitamin BT and has been intensively investigated with regard to its physiological significance and clinical applications. Although carnitine was obtained from natural materials, it has recently been prepared by a synthetic procedure as follows:

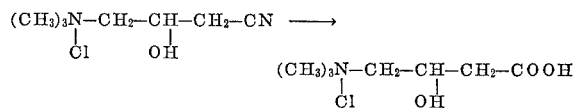

it has recently been prepared by a synthetic procedure carnitine chloride is approximately one-half of that of the l-isomer. Fritz et al., however, found that d-carnitine competitively inhibited the biological action of the l-isomer and indicated the necessity of the resolution of dl-carnitine. (Fritz, I. B., J. Biol. Chem., 240, 2188 (1965)).

l-Carnitinenitrile-N-acyl-D-glutamate and d-carnitinenitrile N-acyl-D-glutamate, and l-carnitinenitrile-N-acyl-L-glutamate and d-carnitinenitrile-N-acyl-L-glutamate are represented by the following formula:

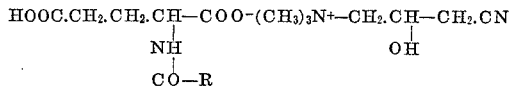

and where CO—R is a fatty acid residue. In particular l-carnitinenitrile-N-acetyl-D-glutamate and d-carnitinenitrile. N-acetyl-D-glutamate, and l-carnitinenitrile. N-acetyl-L-glutamate and d-carnitinenitrile. N-acetyl-L-glutamate represented by the following formula.

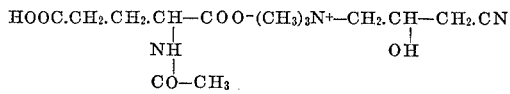

The methods reported previously to produce l- and d-carnitine chloride are as follows: after formation of the dl-carnitine nitrile hydroxide salt by addition of a resolution reagent, the l-carnitine nitrile salt is separated from the d-form salt by means of their difference of solubility. Then the two salts are converted to l- and d-carnitine nitrile chloride, respectively, and on hydrolysis, l- and d-carnitine chloride are obtained. In this procedure, d-tartaric acid, dibenzoyl-d-tartaric acid (Ayata, Yakugaku Sasshi 81, 778 (1961)), a combination of d-camphor-10-sulfonic acid and dibenzoyl-d-tartaric acid (E. Strack et al., Z. Physiol. Chem. 318, 129 (1960)), or l-camphor-10-sulfonic acid (Horiuchi et al., Tokyo Koho Sho 40/3,891) have been employed as resolution reagents.

However, both Ayata's and Strack's methods give a poor yield (around 10%) because in the former method the difference in solubility between the two salts is small and in the latter the process is complicated by use of two different kinds of resolution reagent. Furthermore, Horiuchi's method, which gives a relatively high yield (around 60%) has the disadvantage that l-camphor-10-sulfonic acid is extremely expensive. Thus, since the compound obtained by this latter method is expensive, this procedure has never been widely employed.

The present invention permits the synthesis of optically active salt complexes of N-acyl-glutamic acid and carnitine nitrile hydroxide and the preparation of l- or d-carnitine chloride from these salt complexes simply and in high yield. N-acyl-d-glutamic acids of N-acyl-l-glutamic acids, and especially N-acetyl-d-glutamic acid or N-acetyl-l-glutamic acid, easily react with d- or l-carnitine nitride hydroxide to form the complexes shown in the following formula and from these, l- and d-carnitine chloride are readily obtained.

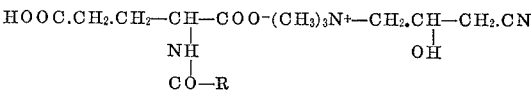

where CO—R is a fatty acid residue. These N-acyl-glutamic acids have not been used previously as resolution reagents. Among these salt complexes, l-carnitine nitrile N-acetyl-d-glutamate and d-carnitine nitrile N-acetyl-l-glutamate are highly insoluble, while d-carnitine nitrile N-acetyl-d-glutamate and l-carnitine nitrile N-acetyl-l-glutamate are quite soluble in polar solvents such as methanol, ethanol or isopropanol. Therefore, by use of these solubility differences, this method is useful not only for the resolution of d,l-carnitine, but also for the resolution of N-acyl-d-l-glutamic acid and particularly of N-acetyl-d-l-glutamic acid. The outline of the procedures used to obtain the complexes and to resolve d,l-carnitine chlorides is as follows:

(1) The salt complexes of d,l-carnitine nitrile and N-acetyl-d-glutamic acid were dissolved in a polar solvent such as ethanol or methanol at 50–100° C. and the solution was then cooled. The salt complex of l-carnitine nitrile and N-acetyl-d-glutamic acid was crystallized and the salt complex of d-carnitine nitrile and N-acetyl-d-glutamic acid remainded in the mother liquid. The crystals were dissolved in water and treated with HCl. N-acetyl-d-glutamic acid was precipitated. The filtrate was condensed and l-carnitine nitrile was crystallized after concentration. l-Carnitine nitrile was hydrolyzed with HCl to l-carnitine chloride by the standard method. The mother liquid containing the salt complex of d-carnitine nitrile and N-acetyl-d-glutamic acid was concentrated and the residue was dissolved in water and treated with HCl. A precipitate of N-acetyl-d-glutamic acid was obtained and the filtrate was treated as above. d-Carnitine chloride was obtained via d-carnitine nitrile chloride.

(2) The salt complexes d,l-carnitine nitrile and N-acetyl-l-glutamic acid were dissolved in a polar solvent as described above in (1). The crystalline salt complex of d-carnitine nitrile and N-acetyl-l-glutamic acid was isolated and d-carnitine chloride was obtained via d-carnitine nitrile chloride. l-Carnitine chloride was synthesized vial l-carnitine nitrile chloride from the mother liquid containing the salt complex of l-carnitine nitrile and N-acetyl-l-glutamic acid. The principle of this method of resolution of carnitine is the difference in solubility of the optically active salt complexes of carnitine nitrile and N-acetyl-glutamic acid in a polar solvent. The yields of d-carnitine chloride and l-carnitine chloride were very high, being about 90–80%. N-acetyl-d-glutamic acid and N-acetyl-l-glutamic acid which were used as resolution reagents were easily synthesized in high yield by acetylation of commerical d- or l-glutamic acid. This resolution reagent was recovered in high yield after reaction and used repeatedly. l-Carnitine chloride, which was obtained by the method described in this present invention, plays an important role in the metabolism of lipid and sugar and is thought to have many clinical applications. The products here described have been found to be particularly useful in the treatment of diabetes mellitus, hyperthyroidism, improvement of ketone body in vivo, and acceleration of digestive function, by injection or oral administration. Typical examples of the preparation of this new salt complex and its utilization for the resolution of d- and l-carnitine are given below.

EXAMPLE I 17.9 grams of d,l-carnitine nitrile chloride were dissolved in 200 milliliters of water, and the solution was treated with 13 g. of silver oxide. In this way, d,l-carnitine nitrile hydroxide was obtained. 18.9 g. of N-acetyl-d-glutamic acid were dissolved in this reaction mixture. The solution was concentrated and dried under reduced pressure. The residues thus obtained were dissolved in 100 milliliters ethanol with heat, and the solution was stood over-night in an ice box. In this way, the complex of l-carnitine nitrile and n-acetyl-d-glutamic acid was crystallized out quantitatively. These crystals were filtered and washed with ethanol. They were recrystallized from 95% ethanol, giving a yield of the salt complex of 15 g. (90.7%) with a melting point of 156–157° C. and $[\alpha]_D^{30}=-14.8°$.

This crystalline salt complex was dissolved in 15 milliliters of water, and 4.5 milliliters concentrated hydrochloric acid were added to precipitate N-acetyl-d-glutamic acid. After filtration, the filtrate was concentrated under reduced pressure, and l-carnitine nitrile chloride was obtained. This was recrystallized from ethanol, with a yield of 7.2 g. (80.4%) and a melting point of 248–249° C. $[\alpha]_D^{30}=-26.5°$.

4.5 g. of carnitine nitrile chloride were boiled for 4 hours with 7.5 g. of concentrated hydrochloric acid. The resulting ammonium chloride was filtered off, and the filtrate was concentrated under the reduced pressure, and the residue was dissolved in warm ethanol and the solution was cooled. The l-carnitine chloride thus obtained was recrystallized from ethanol, giving a yield of 3.9 g. with a melting point of 136–137° C. $[\alpha]_D^{30}=-23.9°$.

The filtrate and washings, obtained from the filtration of l-carnitine nitrile N-acetyl-d-glutamate were combined, and concentrated to 20 milliliters. To this solution, 4.5 milliliters of concentrated hydrochloric acid were added, and the mixture was cooled, resulting in the precipitation of N-acetyl-d-glutamic acid. After filtration, the filtrate was concentrated almost to dryness and crude d-carnitine nitrile chloride was obtained. This was recrystallized from methanol, giving a yield of 6.7 g. (75.9%) with a melting point of 248–249° C. and $[\alpha]_D^{30}=+26.4°$. Four grams of this compound were treated with concentrated hydrochloric acid as described above, and 3.5 g. of d-carnitine chloride were obtained, with a melting point of 136–137° C., and $[\alpha]_D^{30}=+23.8°$.

17 grams of the N-acetyl-d-glutamic acid used as the resolution reagent were recovered (89.4%)

EXAMPLE II 16.7 kg. of d,l-carnitine nitrile chloride were dissolved in 460 liters of water, and this solution was passed through a column of 200 liters of anion exchange resin. 17.6 kg. of N-acetyl-l-glutamic acid were dissolved in 750 liters of this solution containing d,l-carnitine nitrile hydroxide, and the solution was concentrated to dryness. The residue was dissolved in 28 liters of warm methanol, and the solution was cooled to −4∼5° C. and stood for 18 hours. The salt complex of d-carnitine nitrile and N-acetyl-l-glutamic acid was precipitated. The precipitate was filtered, yielding 14.9 kg. of material. This was dissolved in 14.9 liters of warm water, and 3.73 liters of concentrated hydrochloric acid was added precipitating N-acetyl-l-glutamic acid. The precipitate was filtered off, yielding 8.07 kg. of material. Thirty liters of the filtrate were concentrated to dryness, and dissolved in 18.6 liters of methanol and cooled. The crystals were filtered off and 7.77 kg. of material with a melting point of 156–157° C. and $[\alpha]_D^{30}=+15.0°$ were obtained.

The filtrate, which was obtained from filtration of 14.9 kg. of d-carnitine nitrile N-acetyl-l-glutamate, was concentrated to dryness, and to the residues 12.3 liters of water and 3.65 liters of concentrated hydrochloric acid were added. On cooling this, 7.78 kg. of N-acetyl-l-glutamic acid was obtained. (Thus, the total recovery of N-acetyl-l-glutamic acid was 90.1%). 2.5 liters of the filtrate were concentrated to dryness, and to the residue 1.86 liters of methanol were added. The crystals formed were filtered off and 7.3 kg. of l-carnitine nitrile chloride were obtained. This was recrystallized from hot methanol, and filtered off, with a yield of 70.7%. l-Carnitine chloride, which was prepared from this material, had a melting point of 136–137° C. and $[\alpha]_D^{30}=-23.7°$.

I claim:

1. The compound

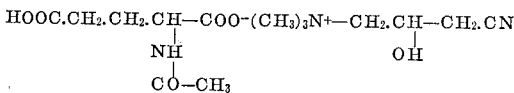

2. The compound l-carnitinenitrile. N-acetyl-D-glutamate represented by the following formula:

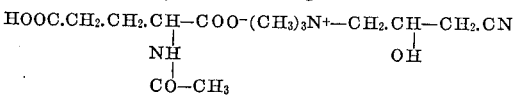

References Cited

Noller, "The Chemistry of Organic Compounds," 2nd ed., W. B. Saunders Co., 1957, p. 144.

Wagner & Zook, "Synthetic Organic Chemistry," Wiley & Sons, 1953, p. 412.

JOSEPH P. BRUST, Primary Examiner

U.S. Cl. X.R.

260—404.5, 465, 465.5, 534